United States Patent Office 2,840,482
Patented June 24, 1958

2,840,482

POTASSIUM-FLUORINE GLASSES

William J. Knapp, Los Angeles, Calif., and Isadore Mockrin, Philadelphia, Pa., assignors to Pennsalt Chemicals Corporation, a corporation of Pennsylvania Application February 27, 1952, Serial No. 273,672

9 Claims. (Cl. 106—48)

This invention relates to novel potassium-fluorine glasses and methods of making the same and to improved enamel compositions suitable for forming protective and decorative coatings on aluminum and aluminum base metals.

In our copending application Serial No. 273,671, filed together with the present application, we have described new and novel potassium-fluorine glasses many of which are suitable for the preparation of frits for enameling aluminum and aluminum alloy surfaces. The present invention is drawn to potassium-fluorine glasses which come within the broad class of glasses described and claimed in the above referred to copending application. The present invention differs primarily from the invention described in our copending application in that it is based on our further discovery that when using potassium fluosilicate as one of the primary batch ingredients, surprising results are obtained if the potassium fluosilicate is used in quantities such as to give in the glass formed approximately 50% potassium fluosilicate on a calculated basis.

When working with potassium fluosilicate in the glass batches, it was discovered that minimum fusion temperature glasses were obtained when the amount of potassium fluosilicate in the batch was such as to give, on a calculated basis, a glass having approximately 50% potassium fluosilicate by weight. When the quantity of potassium fluosilicate was substantially reduced or increased over this amount, the fusion temperature of the resulting composition increased. It was also noted that by having approximately 50% of the glass composition of potassium fluosilicate, the number of glasses formed was substantially greater than the glasses formed when the amount of potassium fluosilicate employed was substantially increased or reduced, i. e., the glass-forming area in a system $K_2SiF_6$, $Al_2O_3$, $SiO_2$, $B_2O_3$ is a maximum on approximately the 50% plane of the $K_2SiF_6$.

As a result of this discovery, low-fusion temperature glasses can more readily be prepared by fixing the optimum amount of the potassium and fluorine added through the addition of these elements in the form of potassium fluosilicate. This permits considerable variation in the other ingredients of the batch so as to obtain a large variety of glasses all having relatively low fusion temperatures. Accordingly, we have found that a large number of glasses, having low fusion temperatures, can be obtained by working with a four component system comprising essentially $K_2SiF_6$—$Al_2O_3$—$B_2O_3$—$SiO_2$ and keeping the $K_2SiF_6$ in the final glass, on a calculated basis, in the range of 45 to 55% by weight of the glass, the preferred glasses being obtained when the total amount of potassium fluosilicate is approximately 50% of the final glass compostion.

The glass compositions of our present invention, besides containing potassium and silicon from the 45 to 55% potassium fluosilicate, also contain at least two of the oxides, $Al_2O_3$, $B_2O_3$, and $SiO_2$. Though it is generally preferred that some of all of these calculated oxides, $Al_2O_3$, $B_2O_3$ and $SiO_2$ be present, useful glass compositions can still be obtained when any one of these three oxides is omitted as long as at least two of them are present. In is preferred, however, that the $Al_2O_3$, $B_2O_3$ and additional $SiO_2$ not be present in the final glass in calculated amounts greater than 36% $Al_2O_3$, 50% $B_2O_3$ and 47% additional $SiO_2$. All percentages both in the specification and claims are on a weight basis. The calculated fluorine content of these glasses varies from 23 to 29%. The glasses may also contain other ingredients, together with these oxides, as is clearly illustrated by the glasses of the following table. However, it is preferred that the $K_2SiF_6$, $Al_2O_3$, $SiO_2$ and $B_2O_3$ make up at least 90% of the total glass.

| Glasses | 1 | 2 | 3 | 4 | 5 |
|---|---|---|---|---|---|
| $K_2SiF_6$ | 45.0 | 50.0 | 47.5 | 45.0 | 45.0 |
| $K_2TiF_6$ | 5.0 | | | | |
| KCl | | | 5.0 | | |
| $SiO_2$ | 20.0 | 20.0 | 19.0 | 25.0 | 27.5 |
| $Al_2O_3$ | 22.5 | 17.5 | 21.4 | 22.5 | 17.5 |
| $B_2O_3$ | 7.5 | 7.5 | 7.1 | 2.5 | 5.0 |
| $ZrO_2$ | | 5.0 | | | |
| $PbF_2$ | | | | 5.0 | |
| $BiF_3$ | | | | | 5.0 |
| Fusion Temp., °C.* | 561 | 567 | 547 | 579 | 587 |

(*By fusion block method, see Andrews, "Enamels," p. 331, The Twin City Printing Co., Champaign, Illinois, 1935.)

In preparing enamel frits, we prefer to use glasses of our present invention generally containing on a calculated weight basis 45 to 55% $K_2SiF_6$, 6 to 36%, $Al_2O_3$, 0 to 28% $SiO_2$ and 2 to 47% $B_2O_3$.

The following example illustrates the method of calculation used to obtain these limits:

Assume a batch containing 29.3% by weight $Al_2O_3.3H_2O$, 11.3% $H_3BO_3$, 17.0% $SiO_2$ and 42.5% $K_2SiF_6$. The $Al_2O_3$ obtained from the $Al_2O_3.3H_2O$ and the $B_2O_3$ from the $H_3BO_3$ are calculated. The $SiO_2$ and $K_2SiF_6$ are used as such. This gives:

Parts by weight
$Al_2O_3 = 29.3 \times 0.653 = 19.1$
$B_2O_3 = 11.3 \times 0.563 = 6.4$
$SiO_2 = 17.0 \times 1 = 17.0$
$K_2SiF_6 = 42.5 \times 1 = 42.5$ Using these weight values, the calculated composition in terms of percent is:

| | Percent |
|---|---|
| $Al_2O_3$ | 22.5 |
| $B_2O_3$ | 7.5 |
| $SiO_2$ | 20.0 |
| $K_2SiF_6$ | 50.0 |
| | 100.0 |

Of this, the fluorine makes up 25.9%.

The surprising results obtained by working with potassium fluosilicate in amounts of approximately 50% and some of the characteristics of the glasses so obtained are more clearly illustrated by reference to the accompanying drawings in which:

Figure 1a is a tetrahedron of the system $Al_2O_3$, $B_2O_3$, $SiO_2$, $K_2SiF_6$ on which the 45% and 55% $K_2SiF_6$ planes are marked;

Figure 4a is a tetrahedron of the system $Al_2O_3$, $B_2O_3$, $SiO_2$, $K_2SiF_6$, on which the 50% plane is marked;

Figure 1:
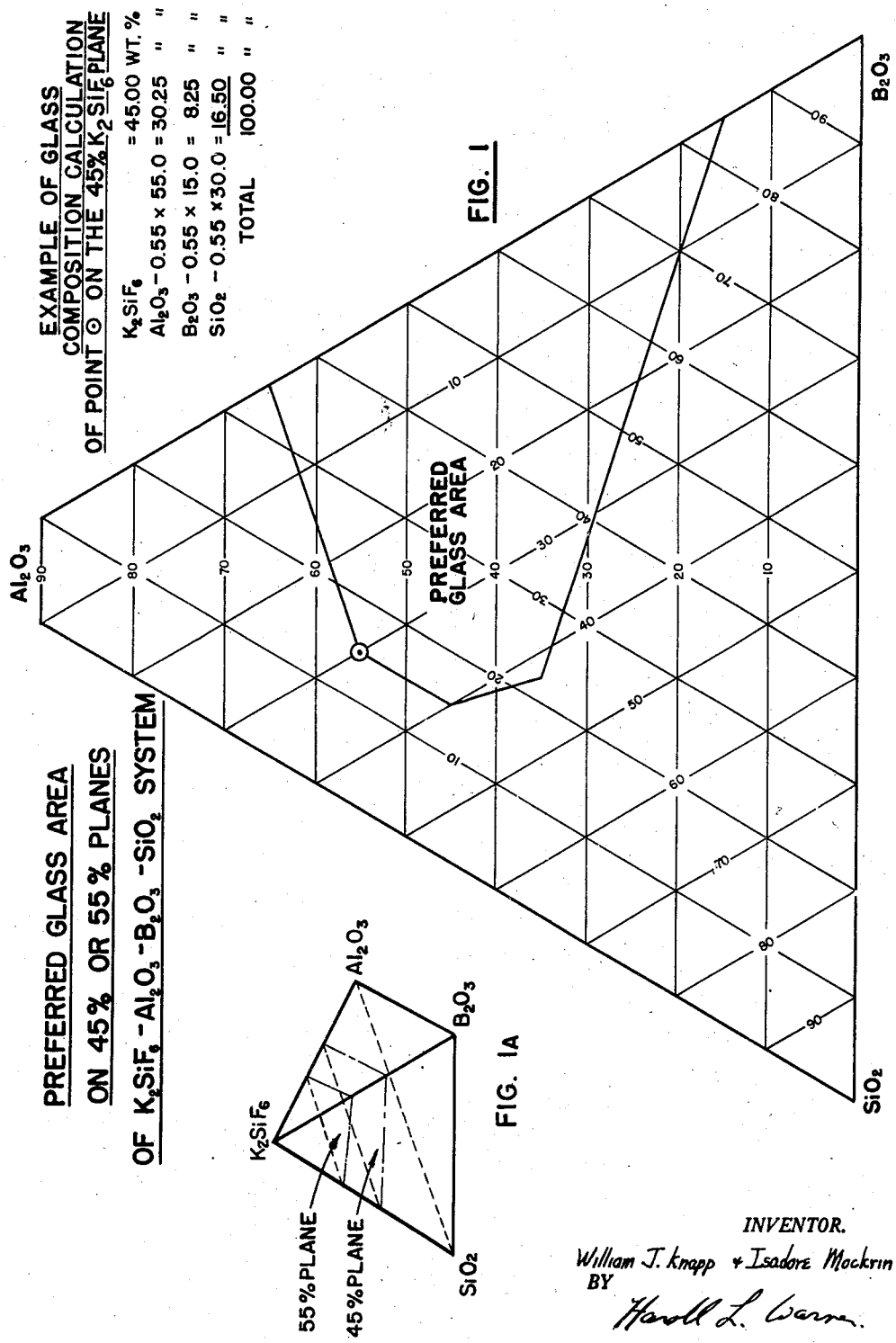
Figure 1 is a section on the 45% or 55% plane of the tetrahedron showing the preferred glass areas.

In making the glasses used for preparing the diagrams in the drawings and used for illustration in the tables and examples of the present invention, the powdered batch ingredients were weighed out, thoroughly mixed, and then placed in clay or Kyanite crucibles. The crucibles were then placed in a furnace in which the temperature was about 1000° C. Though generally a clear liquid was formed in about 30 minutes, the crucibles were usually left in the furnace for about one hour. After this time they were removed and permitted to cool gradually if a glass was desired, or the molten contents of the crucible were cooled rapidly by pouring into water if a frit (quenched glass) was desired. The clay or Kyanite crucibles showed substantially no signs of damage after firing which is surprising in view of the high fluorine content of the glasses prepared. This is probably due to the formation of a protective coating during the preparation of the melt which protects the inner surface of the crucible from the melt.

Figure 3:
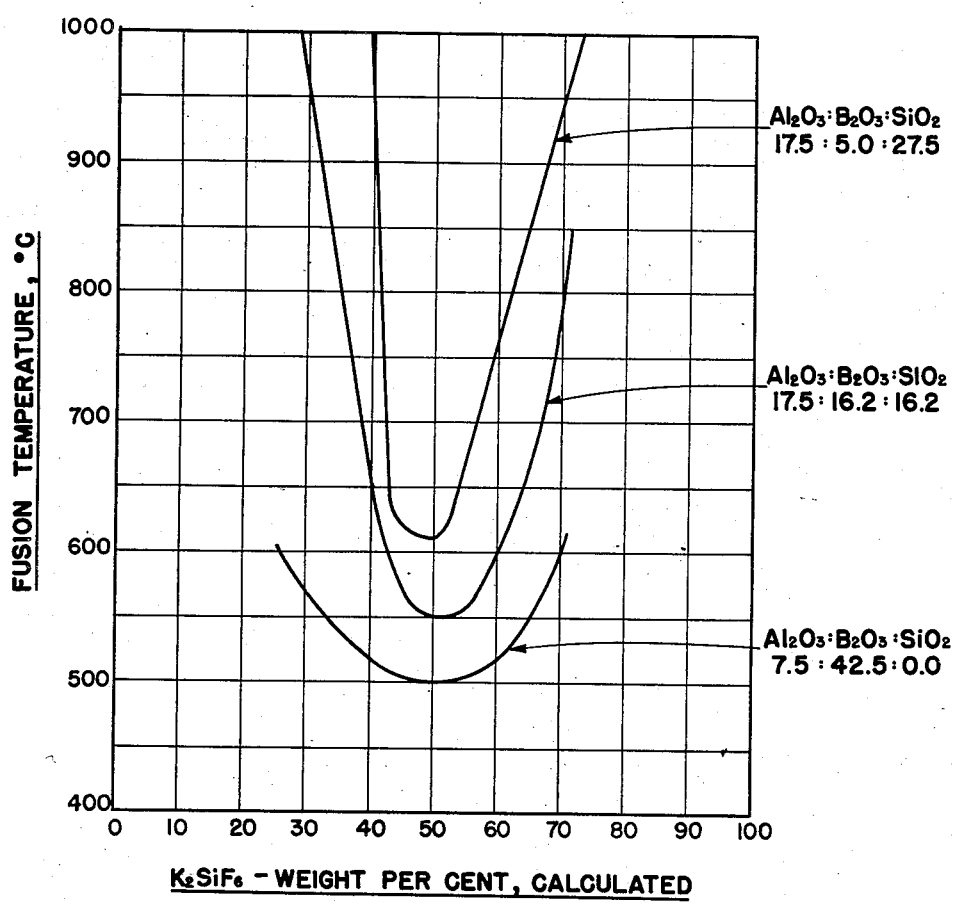
Figure 3 is a graph illustrating the effect of the percent $K_2SiF_6$ concentration on fusion temperature.

On referring to Figure 3 of the drawings, it is apparent that by working with glasses containing 45 to 55% potassium fluosilicate, one immediately obtains the advantage of working with substantially the lowest fusion temperature glasses that can be obtained by using this material. The ability to be able to fix approximately 50% of the glass composition (roughly 40% of the batch ingredients) with the realization that one will obtain minimum fusion temperatures with respect to these ingredients is highly desirable when preparing glasses suitable for the enameling of aluminum, aluminum alloys or other metals having relatively low melting points, or of such cross-sectional dimensions that high firing temperatures for the enamels cannot be used. The fusion temperature of the glass obtained will, of course, vary with respect to the type and amount of other ingredients added to the batch as clearly illustrated in the above mentioned table and in Figure 4 of the drawings. However, when using the potassium fluosilicate in amounts such that the final glass on a calculated basis contains approximately 50% of this material, one has the advantage of working with substantially the lowest fusion temperature glasses and enamels that can be prepared through the use of this material and can freely vary the other ingredients to improve other desirable characteristics such as adhesion, durability of the enamel surface, appearance, etc., without having to adjust the potassium and fluorine contents.

Figure 4:
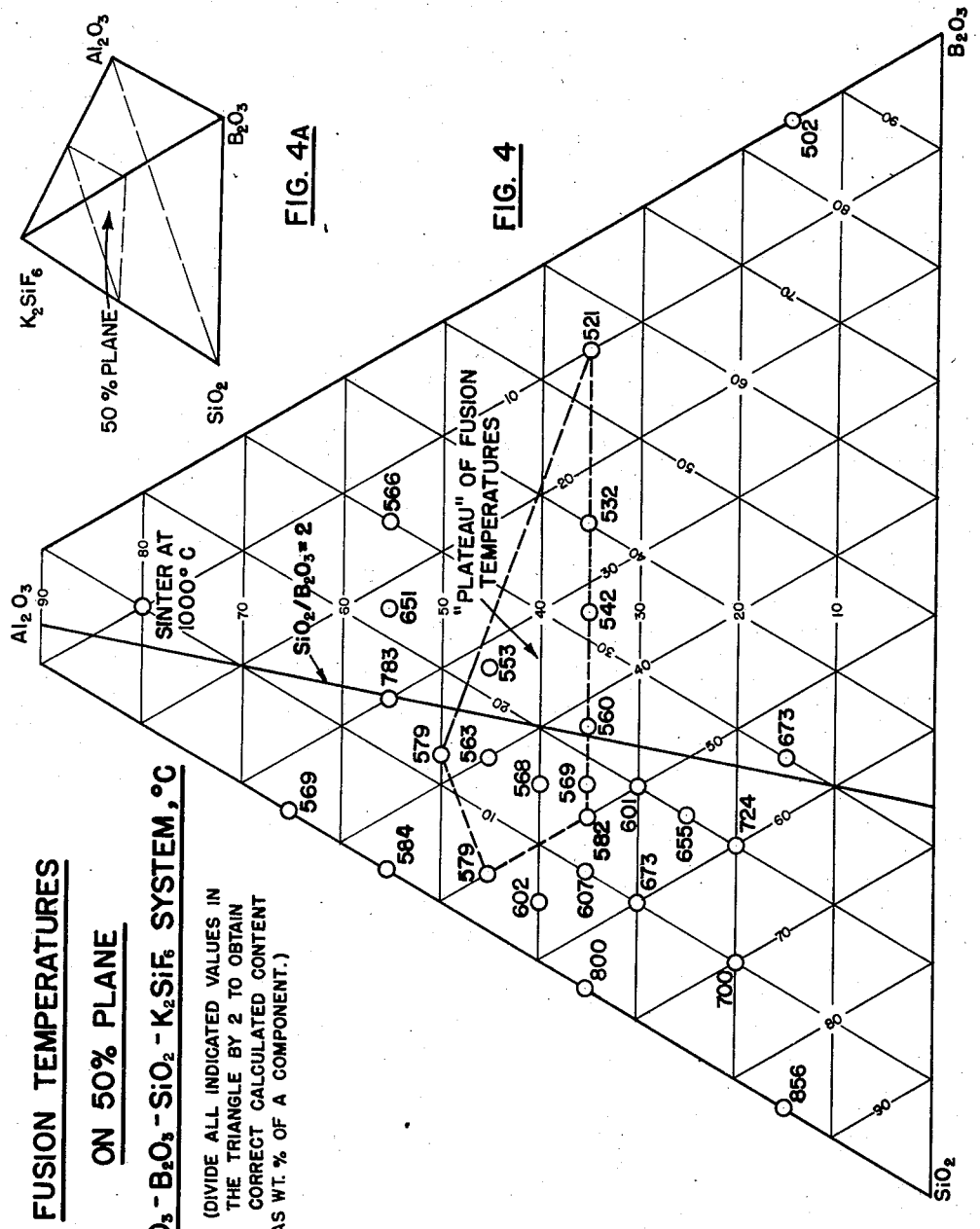
Figure 4 is a section taken on the 50% plane of a $K_2SiF_6$—$SiO_2$—$Al_2O_3$—$B_2O_3$ system illustrated by the tetrahedron showing the variation of fusion temperature with composition.

Figure 4 clearly illustrates the large number of glasses, all having relatively low fusion temperatures, which can be obtained by working on the 50% plane of the $Al_2O_3$—$B_2O_3$—$SiO_2$—$K_2SiF_6$ system.

Figure 5:
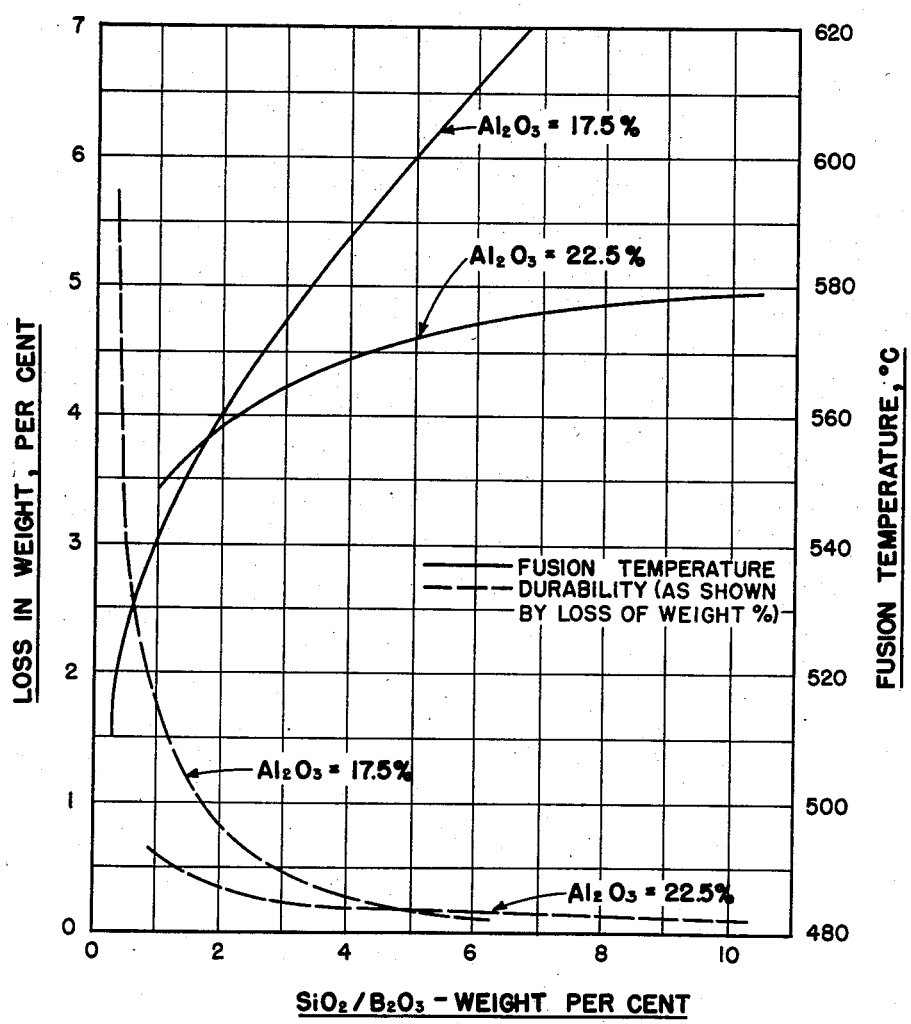
Figure 5 is a graph illustrating the effect of the $SiO_2/B_2O_3$ ratio on fusion temperature and durability.

On studying Figure 4, two interesting features of the glasses of the present invention become apparent. There is a "plateau" of fusion temperatures for a wide variety of glasses varying substantially in their $SiO_2$ and $B_2O_3$ content. Also, the fusion temperatures tend to increase as the ratio of added $SiO_2$ (added as $SiO_2$) to calculated $B_2O_3$ increases while decreasing as this ratio decreases. The first of these features is well illustrated in Figure 4 by the dotted line which marks the apparent plateau of fusion temperatures referred to. The area within the dotted line of Figure 4 designates a range of compositions, varying in $SiO_2$, $B_2O_3$ and $Al_2O_3$ content, which have especially low and relatively uniform fusion temperatures. The second of these features is better illustrated by Figure 5 which shows the relation of the ratio of added $SiO_2$ to calculated $B_2O_3$ on the fusion temperature and durability of glasses of our invention. When the effect of this ratio on durability is considered, the value of the plateau area immediately becomes apparent since, by working in this particular area, a fusion temperature below 600° C. can be maintained while greatly improving the durability of the glasses through increasing the $SiO_2$ to $B_2O_3$ ratio.

In making the glasses and enamels of our present invention we generally prefer to use in the batch ingredients, together with the potassium fluosilicate, alumina hydrate, silicon dioxide where added $SiO_2$ is desired, and boric acid, the batch generally comprising 32 to 48% by weight $K_2SiF_6$, 7 to 41% alumina hydrate, preferably not over 25% silicon dioxide and 4 to 60% boric acid. Where anhydrous materials are used, other than the boric acid, the batch proportions would generally comprise 33 to 53% by weight potassium fluosilicate, 5 to 32% by weight aluminum oxide, 4 to 61% by weight boric acid and not over 27% by weight silicon dioxide, the total batch consisting of at least 85% by weight of these materials. However, in the formation of glasses, once the glass composition has been determined, it is common practice to use various materials in the batch to introduce the desired elements into the glass; thus, to introduce $SiO_2$ one could use $K_2SiO_3$ or $Al_2O_3.2SiO_2.2H_2O$ (kaolin), to introduce $Al_2O_3$ one could use calcined $Al_2O_3$ or $K_2O.Al_2O_3.6SiO_2$ (feldspar), and to introduce $B_2O_3$ one could use $B_2O_3$ or $K_2B_4O_7$.

In order to better illustrate our invention, the following examples of glasses are given. These examples, however, are given for the purpose of illustration only and should not be interpreted as limiting the invention to the specific examples employed since it is obvious that one skilled in the art, after reading the disclosure, could prepare many other specific formulations differing from those set forth in the specific examples, and yet practice the spirit and teaching of our invention.

EXAMPLE 1

A batch containing 24.0 parts by weight alumina hydrate, 23.8 parts boric acid, 15.6 parts silica and 36.6 parts potassium fluosilicate was thoroughly mixed and placed in an open fire-clay crucible. The open crucible with its contents was placed in a preheated furnace having a temperature of between 980° and 1000° C. and left in the furnace for an hour. The molten glass was then cooled to room temperature, a colorless glass being obtained.

The glass had the following calculated composition:

|  | Percent |
|---|---|
| $K_2SiF_6$ | 45.0 |
| $Al_2O_3$ | 19.3 |
| $B_2O_3$ | 16.5 |
| $SiO_2$ | 19.2 |
|  | 100.0 |

One sample of the molten glass was fritted by pouring into cool water while stirring. The frit was then separated from the water, air-dried overnight at room temperature and then oven-dried at a temperature of 140 to 150° C.

The following table of glasses illustrates other preferred glasses of our present invention. These were made in substantially the same manner as described in the above example.

*Weight percent*

|  | 1 | 2 | 3 | 4 | 5 |
|---|---|---|---|---|---|
| $K_2SiF_6$ | 55.0 | 50.0 | 50.0 | 50.0 | 47.5 |
| $Al_2O_3$ | 20.2 | 17.5 | 22.5 | 17.5 | 16.6 |
| $B_2O_3$ | 20.3 | 16.2 | 7.5 | 7.5 | 4.8 |
| $SiO_2$ | 4.5 | 16.3 | 20.0 | 20.0 | 26.1 |
| $TiO_2$ |  |  |  | 5.0 |  |
| $K_3AlF_6$ |  |  |  |  | 5.0 |
| Total | 100.0 | 100.0 | 100.0 | 100.0 | 100.0 |

Though enamel surfaces have been obtained by dusting a dry frit on the surface to be enameled and then firing, we have found that better adherence of the enamel coating to the aluminum surface can be obtained if a slip of the frit in water is first prepared and this slip then applied, for example, by spraying and thereafter firing. Though better adherence of the enamel is obtained by first preparing a slip, the resistance of the enamel coating to chemical attack thus obtained is inferior to the resistance of enamels prepared by dusting the dry frit onto the aluminum surface and then firing. In order to obtain the particular advantages offered by each of these procedures, we prefer to first prepare an enameled surface on the aluminum article by spraying or otherwise coating with a slip of the glass used, firing, and thereafter dusting the enameled surface with a dry powder frit of the glass, and again firing. By this procedure excellent adherence is obtained without detracting from the durability of the final enamel surface. This process is better illustrated by the following example which is given for purposes of illustration only and should not be considered as limiting the invention to the specific example employed.

EXAMPLE 2

An aluminum panel was cleaned with the use of a conventional phosphoric acid type cleaner, water rinsed and then air dried at about 90° C. A slip was prepared from a frit of a glass, having the calculated composition $K_2SiF_6$ 50%, $Al_2O_3$ 17.5%, $B_2O_3$ 16.2% and $SiO_2$ 16.3%, by ball milling 42 parts by weight of frit with 1 part by weight of enameling clay and 57 parts by weight water. The milling was continued until less than 6% of solids were retained on a 200 mesh screen. The slip was sprayed onto the cleaned aluminum panel until a coating weight of about 18 to 20 gms. per square foot was obtained which corresponds to a fired weight of approximately 11 to 15 gms. per square foot. The slip-coated panel was air-dried and then fired at about 530 to 550° C. for from 3 to 5 minutes. The fired panel was removed and dusted with a dry glass frit having the same composition as the undercoat. The dusting was done through an 80-mesh screen, the dusted coat weighing approximately 12 gms. per square foot. The panel was then again fired for approximately 3 minutes at a temperature of approximately 530 to 550° C. Two additional "dusted" cover-coats were then applied and fired in the same manner. The temperature of firing both the ground coat and the cover-coats is, of course, dependent upon the fusion temperature of the glass used, the preferred temperature being dependent on the particular glass composition employed.

Glasses of our present invention, though primarily suited for enameling aluminum surfaces, may have numerous other uses. For example, we have found that some of these glasses make excellent fillers and bonding materials for use in abrasive wheels, are suitable as opal glasses, and form the basis for low-fusing pottery glazes, tile glazes, etc.

The glasses and frits of our present invention are a new product of manufacture as well as the aluminum articles, the surfaces of which have been enameled through the use of frits prepared by the glasses disclosed.

In describing the invention, certain specific forms have been used. However, the invention may be embodied in any specific form which would be apparent to one skilled in the art without departing from the spirit and essential features of the invention. The specific examples and description employed, therefore, should be considered as illustrative and not restrictive in interpreting the invention, and the invention should not be limited to these specific examples.

Having thus described our invention, we claim:

1. A glass composition containing on a calculated basis 45 to 55% by weight $K_2SiF_6$ and at least two materials of the group consisting of $Al_2O_3$, $SiO_2$ and $B_2O_3$ in amounts not substantially in excess of 36% by weight $Al_2O_3$, 47% by weight $SiO_2$ and 2% to 50% by weight $B_2O_3$, said $K_2SiF_6$, $Al_2O_3$, $SiO_2$, and $B_2O_3$ making up at least 90% of the total glass composition.

2. A glass composition in which at least 90% by weight of the glass consists essentially on a calculated basis of 45 to 55% by weight of $K_2SiF_6$, 0 to 28% by weight of $SiO_2$, 6 to 36% by weight of $Al_2O_3$, and 2 to 47% by weight of $B_2O_3$.

Figure 2:
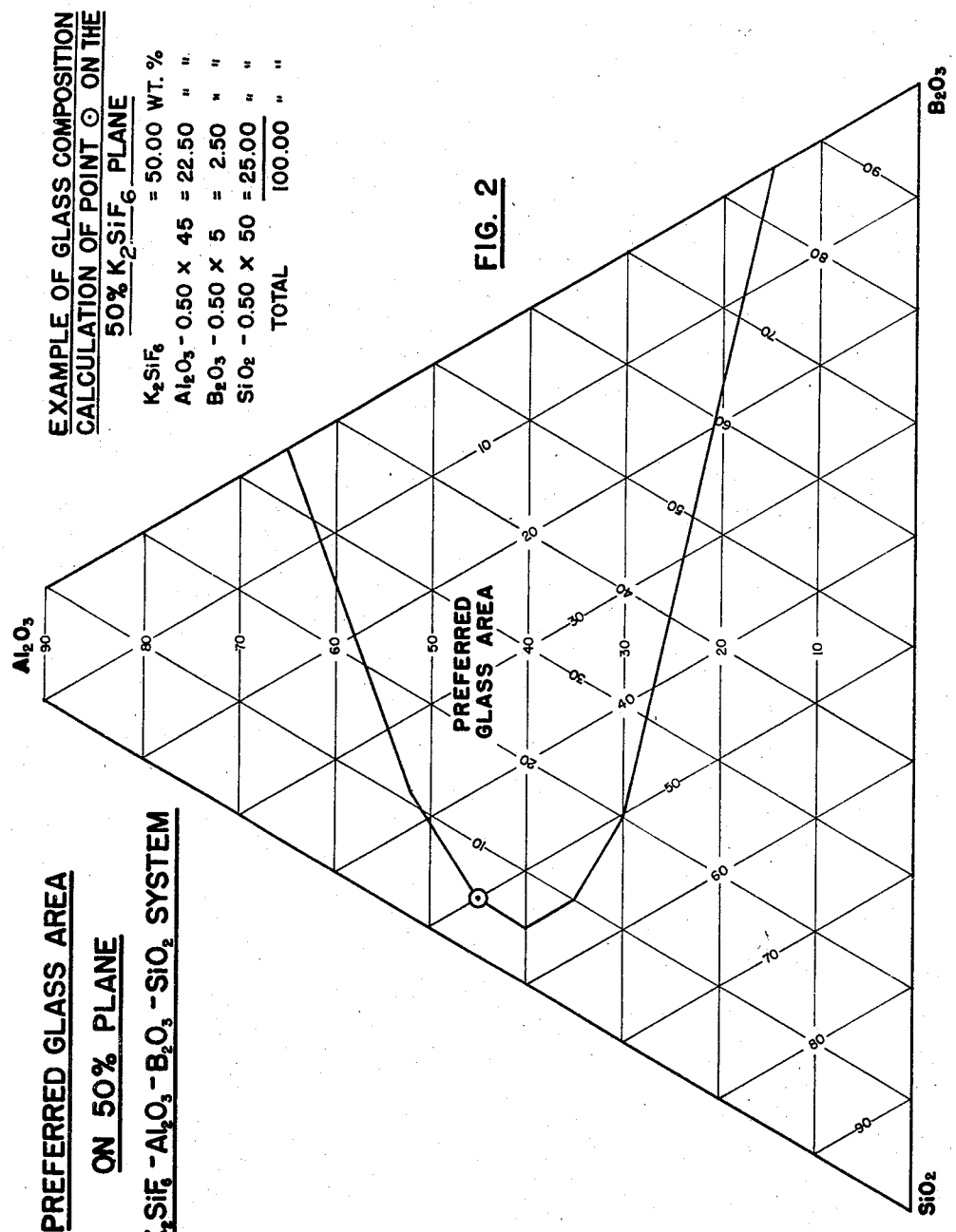
Figure 2 is a section on the 50% plane of the tetrahedron showing the preferred glass areas.

3. A glass having a calculated potassium fluosilicate content of approximately 50% by weight the remainder of the glass composition consisting essentially on a calculated basis of $Al_2O_3$, $B_2O_3$ and $SiO_2$, from a source other than the potassium fluosilicate, in any of the proportions shown within the preferred glass area of Figure 2 of the drawings.

4. A glass composition prepared by fusing a batch comprising 33 to 53% by weight potassium fluosilicate, 5 to 32% by weight aluminum oxide, 4 to 61% by weight boric acid and not over 27% by weight of silicon dioxide, said materials making up at least 85% of said batch.

5. A glass composition prepared by fusing a batch comprising 32 to 48% by weight of potassium fluosilicate, 0 to 25% by weight of $SiO_2$, 7 to 41% by weight of $Al_2O_3.3H_2O$, and 4 to 60% by weight of $H_3BO_3$, said materials making up at least 85% of said batch.

6. The glass composition of claim 2 in which the weight ratio of $SiO_2$ to $B_2O_3$ is at least one.

7. An enamel frit for enameling aluminum and aluminum alloy surfaces prepared from the glass composition of claim 2.

8. As a new article of manufacture an aluminum surface having a closely adherent enamel coating thereon comprising a glass composition as defined in claim 2.

9. A glass composition containing on a calculated basis 45 to 55% by weight potassium fluosilicate, the remainder of the glass composition consisting essentially on a calculated basis of $Al_2O_3$, $B_2O_3$ and $SiO_2$, from a source other than the potassium fluosilicate, in any of the proportions shown within the preferred glass area of Figure 1 of the drawings.

References Cited in the file of this patent

UNITED STATES PATENTS

| 38,286 | Cobley | Apr. 28, 1863 |
| 2,165,554 | Kreidl | July 11, 1939 |

FOREIGN PATENTS

| 638,710 | Germany | 1936 |
| 138,023 | Austria | 1934 |
| 603,623 | Great Britain | 1948 |